United States Patent
Tomisser et al.

(10) Patent No.: US 11,524,712 B1
(45) Date of Patent: Dec. 13, 2022

(54) EQUIPMENT TRANSPORTER

(71) Applicants: James Dale Tomisser, Clinton, WA (US); Christian James Lee Tomisser, Redmond, WA (US)

(72) Inventors: James Dale Tomisser, Clinton, WA (US); Christian James Lee Tomisser, Redmond, WA (US)

(*) Notice: Subject to any disclaimer, the term of this patent is extended or adjusted under 35 U.S.C. 154(b) by 725 days.

(21) Appl. No.: 16/536,696

(22) Filed: Aug. 9, 2019

Related U.S. Application Data

(60) Provisional application No. 62/717,627, filed on Aug. 10, 2018.

(51) Int. Cl.
  *B62B 5/06* (2006.01)
  *B62B 3/06* (2006.01)

(52) U.S. Cl.
  CPC ............ *B62B 5/063* (2013.01); *B62B 3/0606* (2013.01); *B62B 2202/00* (2013.01); *B62B 2203/10* (2013.01)

(58) Field of Classification Search
  CPC . B62B 5/0089; B62B 2203/10; B62B 5/0083; B62B 5/063; B62B 3/0606; B62B 5/00; B62B 33/00; B62B 33/02; B62B 5/06
  USPC ...................................................... 180/19.1
  See application file for complete search history.

(56) References Cited

U.S. PATENT DOCUMENTS

| | | | | |
|---|---|---|---|---|
| 8,967,637 | B2* | 3/2015 | Perry | B60P 3/11 280/47.34 |
| 9,517,783 | B2* | 12/2016 | Smith | B62B 1/26 |
| 10,233,056 | B1* | 3/2019 | Brauer | B62B 3/06 |
| 10,245,885 | B2* | 4/2019 | Davis | B60B 33/0028 |
| 2013/0076004 | A1* | 3/2013 | Perry | B60S 13/00 280/402 |
| 2014/0145131 | A1* | 5/2014 | Cozza | B62B 5/0089 254/7 R |
| 2018/0022155 | A1* | 1/2018 | Davis | B60B 33/0023 414/469 |
| 2019/0276290 | A1* | 9/2019 | Parent | B66F 9/082 |

FOREIGN PATENT DOCUMENTS

GB 2403933 A * 1/2005 ............... B62B 1/26

* cited by examiner

*Primary Examiner* — John D Walters
*Assistant Examiner* — Hilary L Johns
(74) *Attorney, Agent, or Firm* — K&L Gates LLP

(57) ABSTRACT

Various devices and techniques related to equipment transporters are generally described. In some examples, an equipment transporter may comprise a first set of wheels rotatable around an axis of rotation and a body coupled to and rotatably supported by the first set of wheels such that the body is rotatable around the axis of rotation of the first set of wheels. The body may comprise a platform having an upper surface and extending in a first direction. The platform may have a distal end and a proximal end. The body may comprise a tab member located at the distal end of the platform and extending upward from the upper surface. In some examples, the tab member may comprise a pulling face having a first width. In some examples, the body may further comprise a riser located at the proximal end of the platform and extending upward from the upper surface.

20 Claims, 12 Drawing Sheets

EQUIPMENT TRANSPORTER

CROSS-REFERENCE TO RELATED APPLICATIONS

This application claims the benefit of U.S. Provisional Application No. 62/717,627, filed Aug. 10, 2018, the disclosure of which is incorporated herein by reference in its entirety.

FIELD

This application relates to equipment transporters and, more specifically, to equipment transporters designed to move heavy articles such as exercise equipment.

BACKGROUND

Various types of transporters such as hand trucks, dollies, and carts are used to move loads from one place to another. Transporters typically include one or more wheels and one or more surfaces used to support the load during transport. Some transporter designs may offer advantages for particular applications. A transporter may be selected based on the size and/or weight of the load. Additionally, a transporter may be selected according to the environment and/or area in which the transporter is to be used.

SUMMARY

Equipment transporters are generally described. In various examples, the equipment transporters described herein may be specialized to move particular types of loads. For example, the equipment transporters described herein may facilitate the moving of exercise equipment such as treadmills. The equipment transporters described herein may be designed in such a way as to prevent damaging of the load during operation of the equipment transporter. Generally, the term "approximately" as used herein with respect to various sizes and dimensions refers to a tolerance surrounding a specified size or dimension. Generally, when used in reference to a specific size or dimension, the term "approximately", as used herein, refers to a deviation of between 1% and 20% from the specified size.

In accordance with various embodiments of the present disclosure, equipment transporters are generally described. In various examples, the equipment transporters may comprise a first set of wheels rotatable around an axis of rotation. In some further examples, the equipment transporters may comprise a body coupled to and rotatably supported by the first set of wheels such that the body is rotatable around the axis of rotation of the first set of wheels. In various examples, the body may comprise a platform having an upper surface and extending in a first direction. In at least some examples, the platform may have a distal end and a proximal end. In at least some examples, the body may further comprise a tab member located at the distal end of the platform and extending upward from the upper surface. In other examples, the tab member may comprise a pulling face having a first width. In various further examples, the body may comprise a riser located at the proximal end of the platform and extending upward from the upper surface. In some examples, the riser may comprise a curved pushing face having a center portion and two side portions. In at least some examples, the center portion may be closer to the pulling face of the tab than each of the two side portions. In various examples, the curved pushing face may have a second width wider than the first width of the pulling face of the tab member.

In accordance with various embodiments of the present disclosure, methods of transporting a treadmill having a set of treadmill wheels disposed at a first end of the treadmill and a support member disposed at a second end of the treadmill are generally described. In various examples, the methods may include positioning a treadmill transporter adjacent to second end of the treadmill. In some examples, the treadmill transporter may include a set of transporter wheels, a body coupled to and rotatably supported by the set of transporter wheels, and a handle extending from the body. In some examples, the body of the treadmill transporter may include a platform and a tab member located at a distal end of the platform. In various examples, the tab member may extend upward from an upper surface of the platform. In various examples, the body may further include a curved riser located at a proximal end of the platform and extending upward from the upper surface of the platform. In various further examples, the methods may include lifting the handle of the treadmill transporter to rotate the body of the treadmill transporter around an axis of rotation of the set of transporter wheels from an upright position to a rotated position, whereby the tab member is lowered to a height below the support member. In at least some further examples, the methods may include, with the body of the treadmill transporter in the rotated position, rolling the treadmill transporter towards the treadmill to position the platform at least partially underneath the support member. In still other examples, the methods may further include, lowering the handle of the treadmill transporter to rotate the treadmill transporter from the rotated position to the upright position. In some cases, the lowering the handle of the treadmill transporter may cause the platform to exert an upward force on the support member effective to lift the second end of the treadmill from a resting position to an elevated position.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

DETAILED DESCRIPTION

Figure 1:
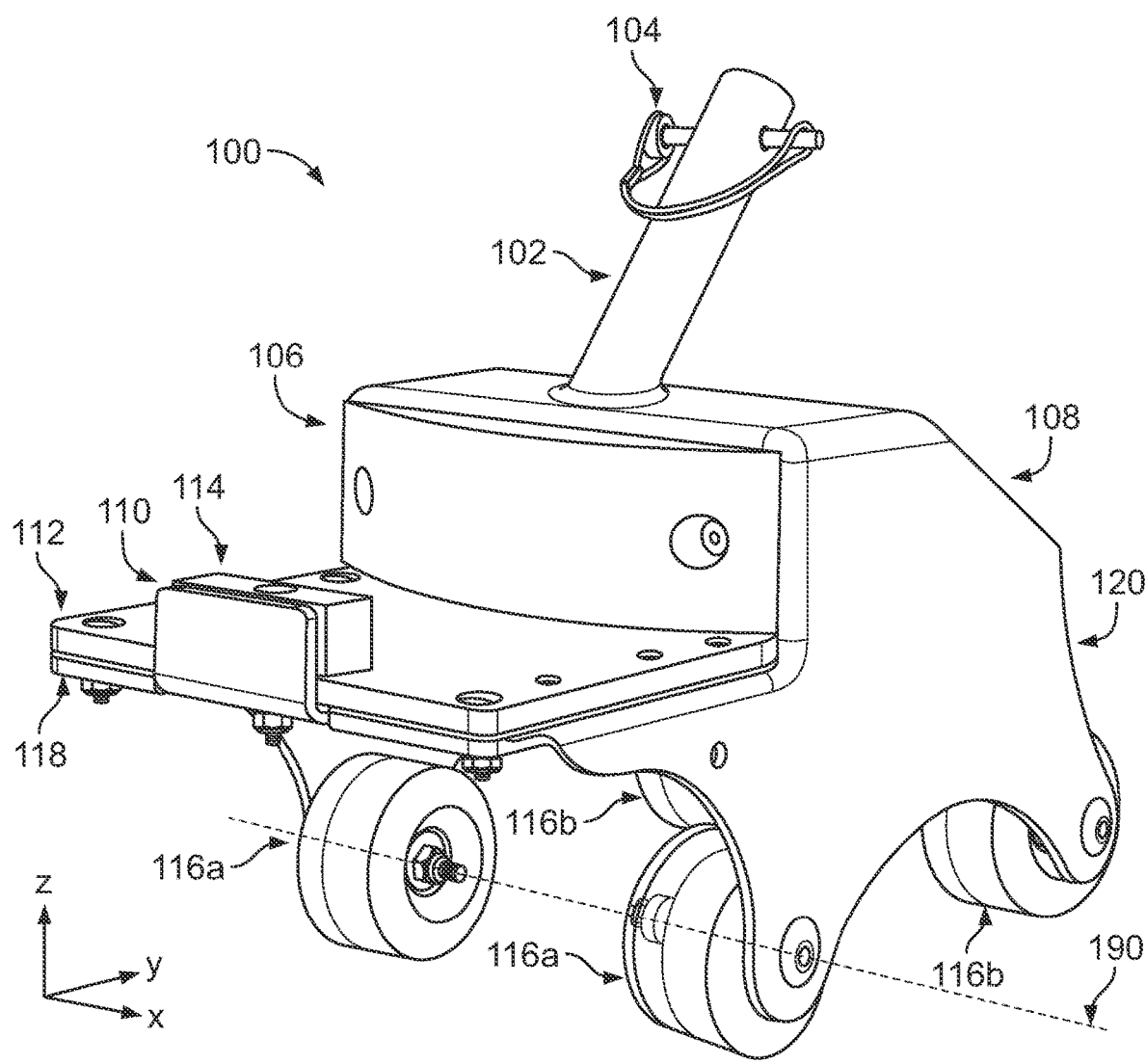
FIG. 1 depicts an isometric view of an equipment transporter, in accordance with some aspects of the present disclosure.

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved equipment transporters. These embodiments may provide improved durability and performance, and may overcome various technical challenges presented when using conventional dollies, hand trucks carts and/or other equipment movers, as described in further detail below.

In various examples, exercise equipment such as treadmills, stair climbers, and other gym equipment may weigh in excess of 500 pounds rendering the equipment difficult to move from place to place. Additionally, such exercise equipment often includes a pair of wheels on only one end of the equipment. Accordingly, the end of the exercise equipment distal to the wheeled end is lifted off the floor in order to roll the exercise equipment from one area to another. Lifting such equipment manually by a human often requires the person to bend down close to the floor (as the non-wheeled end of such exercise equipment is often within a few inches of the floor), lift the non-wheeled end of the heavy equipment off the floor, and move the equipment while continuing to lift the non-wheeled end of the equipment. Moving the equipment in this way is dangerous and may cause injury to the person moving the treadmill (e.g., the person's back, knees, fingers, etc.). Additionally, some individuals may be unable to lift the non-wheeled end of the exercise equipment in order to move the equipment.

Traditional hand trucks and dollies are not designed to move treadmills and other exercise equipment and may be ineffective to maintain the equipment in a stable, lifted position while maneuvering the equipment from one position to another. This is particularly challenging when moving treadmills, which can have an elongated deck with wheels provided only at one end, typically the front end. Additionally, as traditional dollies and hand trucks were not designed to lift such equipment, the use of traditional dollies and/or hand trucks to move exercise equipment may cause damage (e.g., scratching, marking, etc.) to the equipment.

Accordingly, various embodiments of equipment transporters (sometimes referred to as "treadmill transporters") described herein may be particularly well suited to move exercise equipment in a safe and non-strenuous manner without damaging the equipment and without injuring the operator of the equipment transporter. Additionally, as described in further detail below, the various embodiments of equipment transporters described herein may be uniquely configured so as to allow an operator of the equipment transporter to easily steer the equipment while the equipment is secured to the equipment transporter and being moved. For example, the various embodiments of equipment transporters described herein may allow an operator to easily lift a non-wheeled end of a treadmill so that the treadmill rests on the two wheels of the treadmill at one end, and on the equipment transporter at the other end. The operator of the equipment transporter may then maneuver the treadmill as desired using the equipment transporter. For example, the operator may move the treadmill to a different position in order to clean the floor upon which the treadmill was initially positioned prior to movement.

FIG. 1 depicts an isometric view of an equipment transporter 100, in accordance with some aspects of the present disclosure. Equipment transporter 100 may comprise a frame 120. In various examples, frame 120 may be referred to herein as a "body" of the equipment transporter 100. Frame 120 may be made of metal. In various examples, frame 120 may comprise carbon steel with a thickness of greater than ⅛". The carbon steel of frame 120 may be laser cut and machine folded in order to provide a durable chassis for the equipment transporter 100 and to prevent failing of the equipment transporter 100 when supporting loads in excess of 500 lbs.

The body of equipment transporter 100 may be coupled to and rotatably supported by a set of wheels such as wheels 116a. The body may be rotatable around axis of rotation 190 of the first set of wheels 116a.

Equipment transporter 100 may comprise a platform 112. Platform 112 may comprise an upper surface that may be parallel or substantially parallel (e.g., parallel to within +/−2°, 5°, 10°) to a surface upon which wheels 116 (including front wheels 116a and/or rear wheels 116b) are resting when equipment transporter 100 is resting on a floor in an upright position (e.g., when not in use). For example, an upper surface of platform 112 may be parallel or substantially parallel to the x axis depicted in FIG. 1 when equipment transporter is resting on wheels 116 (including front wheels 116a and rear wheels 116b). In various examples, equipment transporter 100 may have a different number of wheels apart from what is shown. For example, equipment transporter 100 may have 3 wheels, 2 wheels, 6 wheels, or some other number of wheels. Platform 112 may comprise a proximal end (e.g., the end of platform 112 closest to riser 106) and a distal end (e.g., the end of platform 112 closes to tab 114).

In various examples, platform 112 may comprise a metal platform frame (e.g., the portion of frame 120 supporting platform 112) and a cushioning member (e.g., the material forming the upper surface of platform 112). In some examples, the metal platform frame may support the platform cushioning member. In various examples, the cushioning member of platform 112 may form the upper surface of platform 112 and may comprise ultra high molecular weight (UHMW) polyethylene plastic. UHMW polyethylene plastic may have a molecular mass of between 3 and 8 million atomic mass units and may be highly durable. Accordingly, UHMW polyethylene plastic may not wear down during use.

Additionally, UHMW polyethylene plastic may protect equipment moved using equipment transporter 100, as UHMW polyethylene plastic may not wear off on and/or damage the equipment. In various other embodiments, platform 112 may comprise other material apart from UHMW polyethylene plastic. The material of platform 112 may be selected from a variety of rubbers, plastics, and/or other polymers. In at least some examples, the material of platform 112 may selected so as to not wear down from use and so as to protect the equipment to be moved using equipment transporter 100. In at least some examples, platform 112 may be 0.5" thick (+/−0.2", 0.3", 0.5", etc.) along the z axis depicted in FIG. 1. Holes may be formed in the UHMW polyethylene plastic of platform 112 in order to affix platform 112 to a portion 118 of the frame 120 underlying and supporting platform 112. In various examples, and as depicted in FIG. 1, platform 112 may be bolted to portion 118 of frame 120.

In various examples, equipment transporter 100 may comprise a tab 114 (sometimes referred to herein as a "tab member"). Tab 114 may be affixed to and/or may be formed as part of platform 112 (e.g., on the distal end of platform 112). Tab 114 may be located at the distal end of platform 112 and may extend upward from the upper surface of platform 112. Tab 114 may comprise a cushioning member comprising a pulling face (e.g., pulling face 314 in FIG. 3). Tab 114 may be approximately 2" wide (e.g., 2"+/−0.1", 0.2", 0.5", etc.) along the x axis. Additionally, tab 114 may be approximately ¾" (e.g., 1"+/−0.1", 0.2", 0.5", etc.) deep along the y axis. In various examples, tab 114 may be approximately ¾" (e.g., 1"+/−0.1", 0.2", 0.5", etc.) high along the z axis. In various examples, tab 114 may comprise a cushioning member made from and/or comprising the same material as the upper surface of platform 112. For example, the cushioning member of tab 114 may comprise UHMW polyethylene plastic.

Tab 114 may comprise a metal tab frame 110. Metal tab frame 110 may support the cushioning member of tab 114 (e.g., the UHMW polyethylene plastic) along the y axis (FIG. 1). As depicted in FIG. 1, in various examples, the metal tab frame 110 may have dimensions that match or approximately match (e.g., to within +/−0.1", 0.2", 0.5", etc.) the dimensions of the cushioning member of tab 114 in the x, z plane. Accordingly, the metal tab frame 110 may support tab 114 as tab 114 may be used to grip (e.g., exert a pulling force on) a portion of an undercarriage of a piece of equipment (e.g., a support member of a treadmill), and may thereafter be used to maneuver the treadmill, as described in further detail below.

Equipment transporter 100 may comprise a riser 106. In various examples, riser 106 may comprise the same material as that of platform 112 and/or tab 114. For example, riser 106 may comprise and/or be formed from UHMW polyethylene plastic. Additionally, riser 106 may be bolted and/or otherwise secured to frame 120. In various examples, riser 106 may be formed so as to include holes through which bolts and/or other fasteners may be inserted and secured in order to secure riser 106 to frame 120. Riser 106 may be located at the proximal end of platform 112 and may extend upward from the upper surface of platform 112. The riser 106 may comprise a curved pushing face (e.g., curved pushing face 306 in FIG. 3).

In various examples, riser 106 may have a curved front surface (e.g., the surface of riser 106 opposite tab 114). The curvature of the front surface of riser 106 may have a radius of curvature of approximately 5" (e.g., 5"+/−0.1", 0.2", 0.3", 0.5" or some other suitable value). The radius of curvature may refer to the radius of a circle that is fit to (e.g., superimposed over) the curved front surface of riser 106, such that the arc of the curved front surface of riser 106 follows the arc of the theoretical circle. As described in further detail below, the curved front surface of riser 106 may allow an operator of equipment transporter 100 to steer and maneuver equipment (e.g., a treadmill or other exercise equipment) when one end of the equipment is supported by equipment transporter 100 (e.g., by platform 112) and the other, distal end of the equipment is supported by two or more wheels of the equipment itself. In various other examples, the front surface of riser 106 (e.g., the surface opposite tab 114) may be curved but may not have a radius of curvature or a constant curvature. Curved pushing face 306 of riser 106 may comprise a center portion 322 and two side portions 324. In various examples, the center portion 322 may be closer to pulling face 314 of tab 114 than each of the two side portions 324. Additionally, the width of curved pushing face 306 of riser 106 may be wider than the pulling face 314 of tab 114. In some examples, the width of curved pushing face 306 may be at least two times greater than the width of pulling face 314. Additionally, in some examples, curved pushing face 306 and pulling face 314 may be orthogonal to the upper surface of platform 112.

Equipment transporter 100 may comprise wheels 116 (including front wheels 116*a* and rear wheels 116*b*). Wheels 116 may be made of any suitable load-bearing material. In various examples, wheels 116 may include bearings effective to allow the wheels to turn on axels with little resistance. As depicted in FIG. 1, wheels 116 may be positioned so that platform 112 is relatively parallel to a surface upon which equipment transporter 100 is resting when not in use and when on a level, planar surface (e.g., a surface parallel to the x, y plane).

Figure 2:
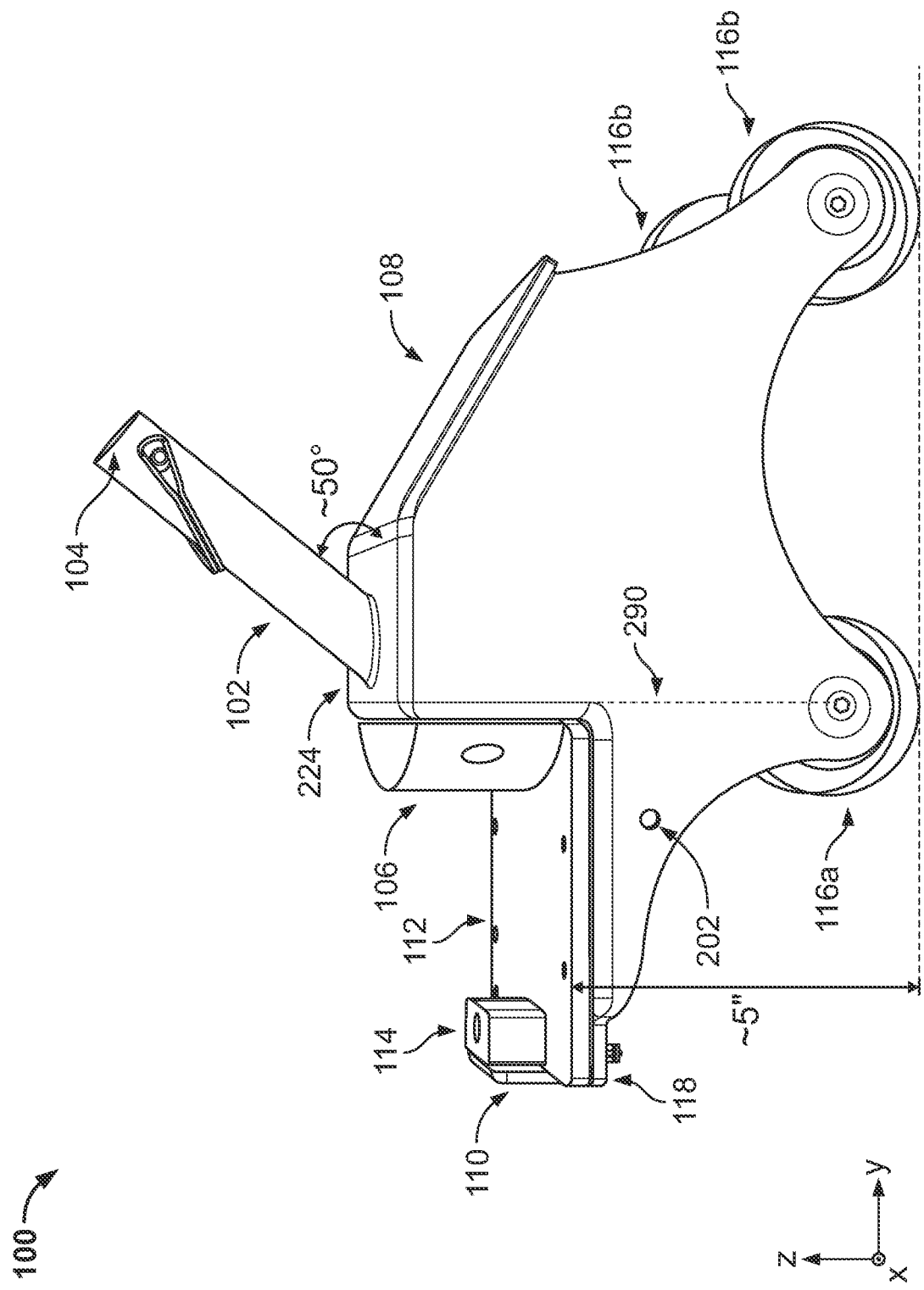
FIG. 2 depicts a side perspective view of the equipment transporter of FIG. 1, in accordance with various aspects of the present disclosure.

As shown in FIG. 2, when equipment transporter is at rest on a level surface (e.g., a surface parallel to x, y plane), the height between the level surface upon which equipment transporter 100 is resting and the upper surface of platform 112 may be approximately 5" (e.g., 5"+/−0.1", 0.2", 0.3", 0.5" or some other suitable value). The distance between the ground surface and the upper surface of platform 112 may be selected based on the height of a support structure on the equipment to be moved using equipment transporter 100.

For example, in reference to FIG. 2, many types of treadmills have a support bar (sometimes referred to herein as a "support member") on the underside of the treadmill that may be used to lift and support the non-wheeled side of the treadmill. The height of the support bar is approximately 4" off the ground surface in many treadmills. Accordingly, in at least some examples, platform 112 may be greater than 4" from the ground when equipment transporter 100 is in an upright position.

In order to load a treadmill or other piece of equipment onto equipment transporter 100, an operator may position the equipment transporter 100 adjacent to the non-wheeled end of the treadmill (and/or adjacent to the support member to be engaged by equipment transporter 100 during loading of equipment transporter 100).

An operator of equipment transporter 100 may rotate the equipment transporter 100 around axis of rotation 190 from an upright position (e.g., the position depicted in FIGS. 1, 2, and 4) by lifting/pushing forward handle 402. In such a manner, equipment transporter 100 may be rotated around axis of rotation 190 from an upright position to a rotated position wherein the equipment transporter is rotated forward onto front wheels 116*a* with rear wheels 116*b* lifted from the ground. In at least some examples, equipment transporter 100 may include a different number of front wheels 116a and/or rear wheels 116b apart from what is shown. In various examples, equipment transporter 100 may be rotated forward such that tab 114 is lowered to a height that is below the support member of the treadmill.

With the body of the treadmill transporter in the rotated position described above, an operator may roll the equipment transporter 100 toward the treadmill to position platform 112 at least partially underneath the support member. In some examples, the support member of the treadmill may be positioned on platform 112 between tab 114 and riser 106. Thereafter, the handle of the equipment transporter 100 may be lowered (and/or pulled backward toward the operator) to rotate equipment transporter 100 from the rotated position to the upright position. Lowering the handle of the equipment transporter 100 may cause platform 112 to exert an upward force on the support member of the treadmill effective to lift the non-wheeled end of the treadmill from a resting position to an elevated position such that the non-wheeled end of the treadmill is supported by platform 112 of equipment transporter 100.

In some examples, rotating the equipment transporter 100 forward (e.g., toward tab 114) onto front wheels 116a may be referred to as "loading" the equipment transporter or may be referred to as placing the equipment transporter into a "loading position". When rotating the equipment transporter 100 forward, the equipment transporter 100 may rotate around axis of rotation 190 (FIG. 1). After positioning a load on platform 112 between tab 114 and riser 106, the operator of equipment transporter 100 may thereafter exert a downward force on the rear of equipment transporter 100 (e.g., the side of equipment transporter 100 that is distal to tab 114) such that the rear wheels 116b return from a lifted position back to a position in which the rear wheels 116b contact the floor. As previously described, the downward force may be provided by pulling down and back on handle 402. At this time, all four wheels (two front wheels 116a and two rear wheels 116b) may be in contact with the floor and platform 112 may be parallel to the floor at a height of approximately 5" from the floor. When all four wheels are in contact with the floor and platform 112 is parallel to the floor, the equipment transporter 100 may be referred to as "loaded" or in a "loaded position". In an example where the support bar is 4" off the ground and platform 112 is 5" off the ground when equipment transporter 100 is in an upright position, transitioning equipment transporter 100 from a loading position to a loaded position results in the non-wheeled end of the treadmill being lifted off the floor to a height of approximately 1".

In various examples, once loaded, an operator may push the handle 402 of the equipment transporter 100 toward the treadmill to cause center region 322 of the curved pushing face 306 of riser 106 to press against the support member of the treadmill, thereby causing the treadmill to move in a direction away from the equipment transporter 100. Conversely, an operator may pull the handle 402 of the equipment transporter 100 to cause pulling face 314 of tab 114 to press against the support member of the treadmill, thereby causing the treadmill to move in a direction toward the equipment transporter 100.

In various further examples, while pushing equipment loaded onto equipment transporter 100, a force may be applied in a lateral direction on handle 402 to cause one of the side portions 324 of riser 106 (FIG. 3) to press against the support member of the treadmill, thereby causing the treadmill to turn in the lateral direction. Similarly, while pulling equipment loaded onto equipment transporter 100, a force may be applied in a lateral direction on handle 402. The curved pushing face 306 of riser 106 may limit the amount by which the equipment transporter 100 may turn while loaded with equipment.

In various examples, to provide stability and additional leverage, an operator of equipment transporter 100 may position one of the operator's feet on rear step surface 108. Rear step surface 108 is angled downward as shown in FIG. 2 to provide a surface on which the operator may rest one of the operator's feet. When the equipment transporter 100 is transitioned from the "tipped forward" loading position to the loaded position, the operator may apply a downward force with the operator's foot that is positioned on rear step surface 108 in order to assist in the lifting of the equipment onto equipment transporter 100. The downward force may work in conjunction with the lowering and/or pulling back of handle 402 to rotate the equipment transporter 100 from the rotated, "unloaded" position to the upright, "loaded" position. Additionally, the operator may steady the equipment transporter 100 using the operator's foot on rear step surface 108 while lifting the equipment.

As previously described, while loading equipment onto equipment transporter 100, equipment transporter may be rotated around axis of rotation 190. The axis of rotation 190 may define a vertical plane 290. In various examples, tab 114 and platform 112 may extend forward (e.g., in the negative y direction in FIG. 2) away from vertical plane 290.

Although in the foregoing example the platform is 5" from the floor (or other relatively flat surface upon which the equipment transporter is resting), it will be appreciated by those skilled in the art that the height of platform 112 from the floor may be different in various other embodiments depending on the height of the structure that the particular equipment transporter 100 is designed to transport. For example, if a bottom support on a treadmill is instead 5" off the ground, the platform of equipment transporter 100 may be 6" off the ground so that the non-wheeled end of the treadmill is lifted 1" from the ground for maneuvering.

Equipment transporter 100 may include a handle attachment portion 102. Handle attachment portion 102 may be welded to a top portion 224 of frame 120. In various examples, top portion 224 (depicted in FIG. 2) of frame 120 may be parallel to the x, y plane. Additionally, in various examples, the handle attachment portion 102 may be deflected to form an angle of approximately 50° between handle attachment portion 102 and top portion 224, as shown in FIG. 2.

Figure 4:
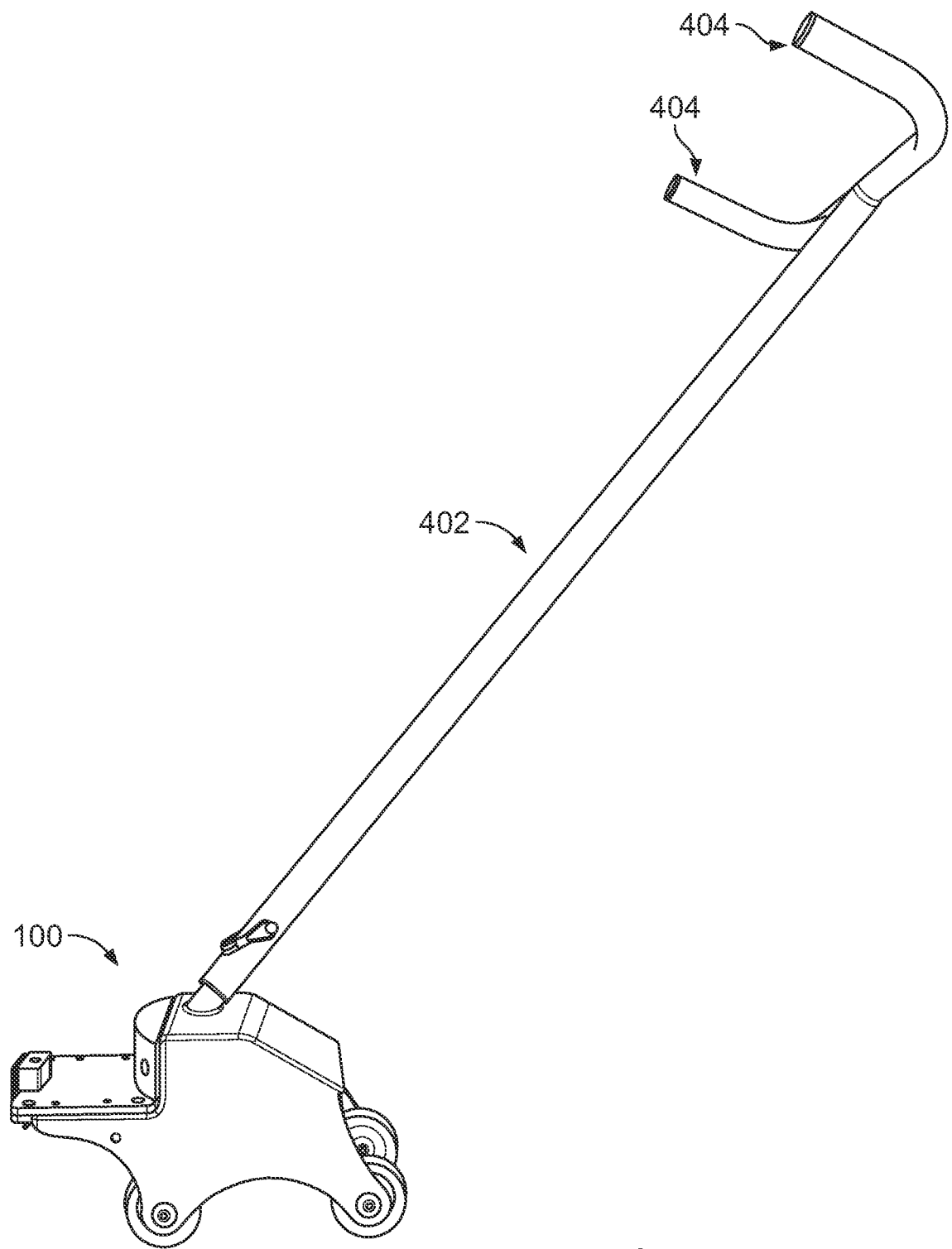
FIG. 4 depicts an example of the equipment transporter of FIGS. 1-3 coupled to a mandrel, in accordance with various aspects of the present disclosure.

Handle attachment portion 102 may be a hollow tube configured to mate with a handle of equipment transporter 100. FIG. 4 depicts an example handle 402 extending from the body of equipment transporter 100. Handle 402 may comprise a grip portion 404 (sometimes referred to as a mandrel). In various examples, grip portion 404 may extend orthogonally from the shaft of handle 402. It should be appreciated that handle 402 depicted in FIG. 4 is but one example of a handle that may be used with equipment transporter 100. Other shapes and dimensioned handles may be used in accordance with the equipment transporter. Handle 402 may be used as a lever when transitioning equipment transporter 100 from a loading position (e.g., a tipped forward position where only front wheels 116a are contacting the ground) to a loaded position (e.g., a "flush" position in which all four wheels 116a, 116b are in contact with the ground and at least a portion of the equipment is lifted off the ground).

In the example depicted in FIG. 4, an operator of equipment transporter 100 may exert a forward and upward force on grip portion 404 to tip the equipment transporter 100 forward while loading equipment onto the equipment transporter 100. Thereafter, to transition equipment transporter 100 from a loading position to a loaded position in which a portion of the equipment is lifted from the ground, the operator may exert a downward, backward force on grip portion 404 using handle 402 as a lever to lift the equipment from the ground.

Figure 5:
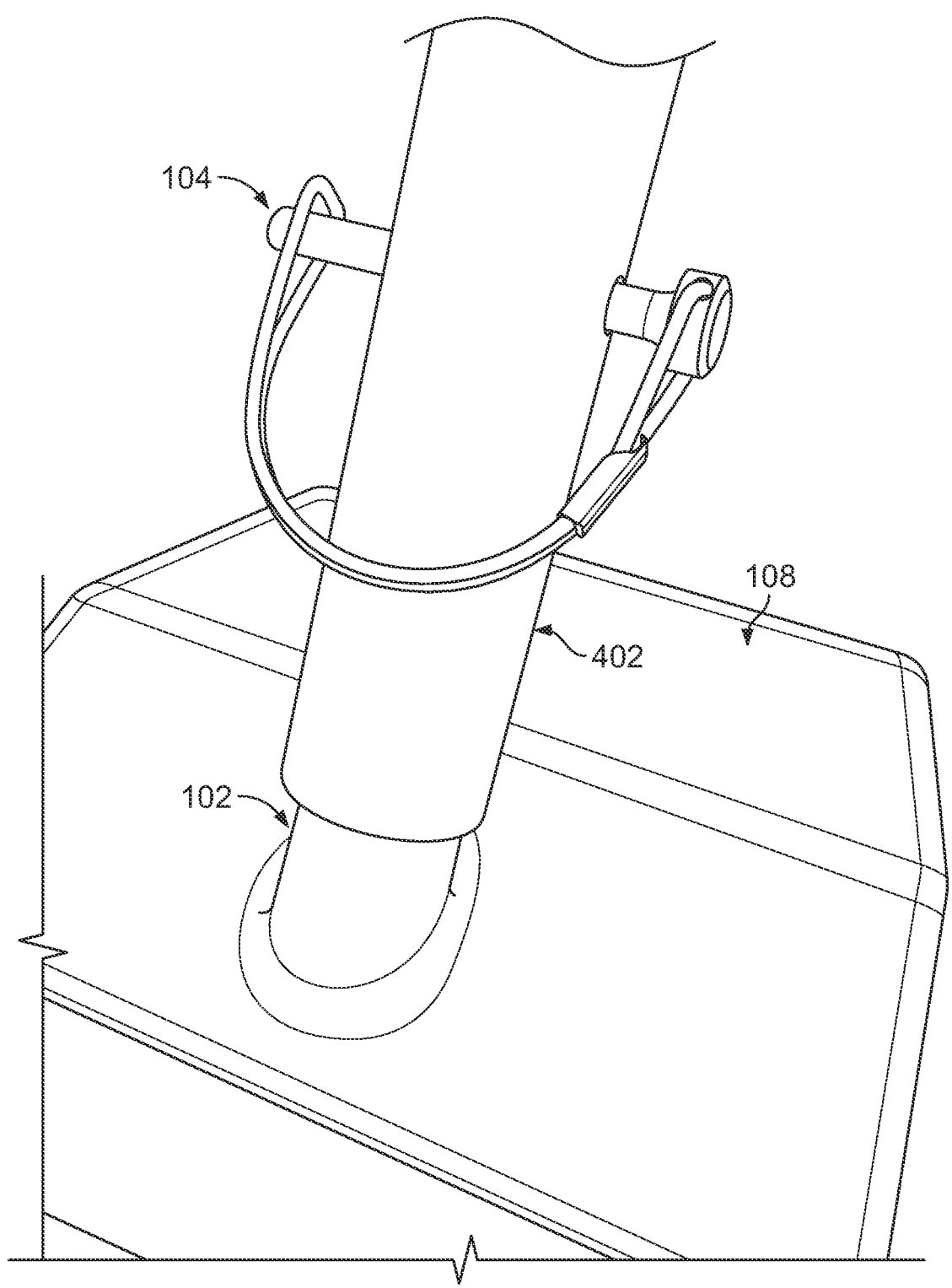
FIG. 5 depicts an interface between the mandrel and the equipment transporter of FIGS. 1-4, in accordance with various aspects of the present disclosure.

In at least some examples, the length of handle 402 may be adjustable such that operators of varying heights may operate the equipment transporter 100. Additionally, as depicted in at least FIGS. 1 and 5, equipment transporter 100 may comprise a pin 104 or other locking mechanism to secure a handle (e.g., handle 402) within the handle attachment portion 102.

Figure 3:
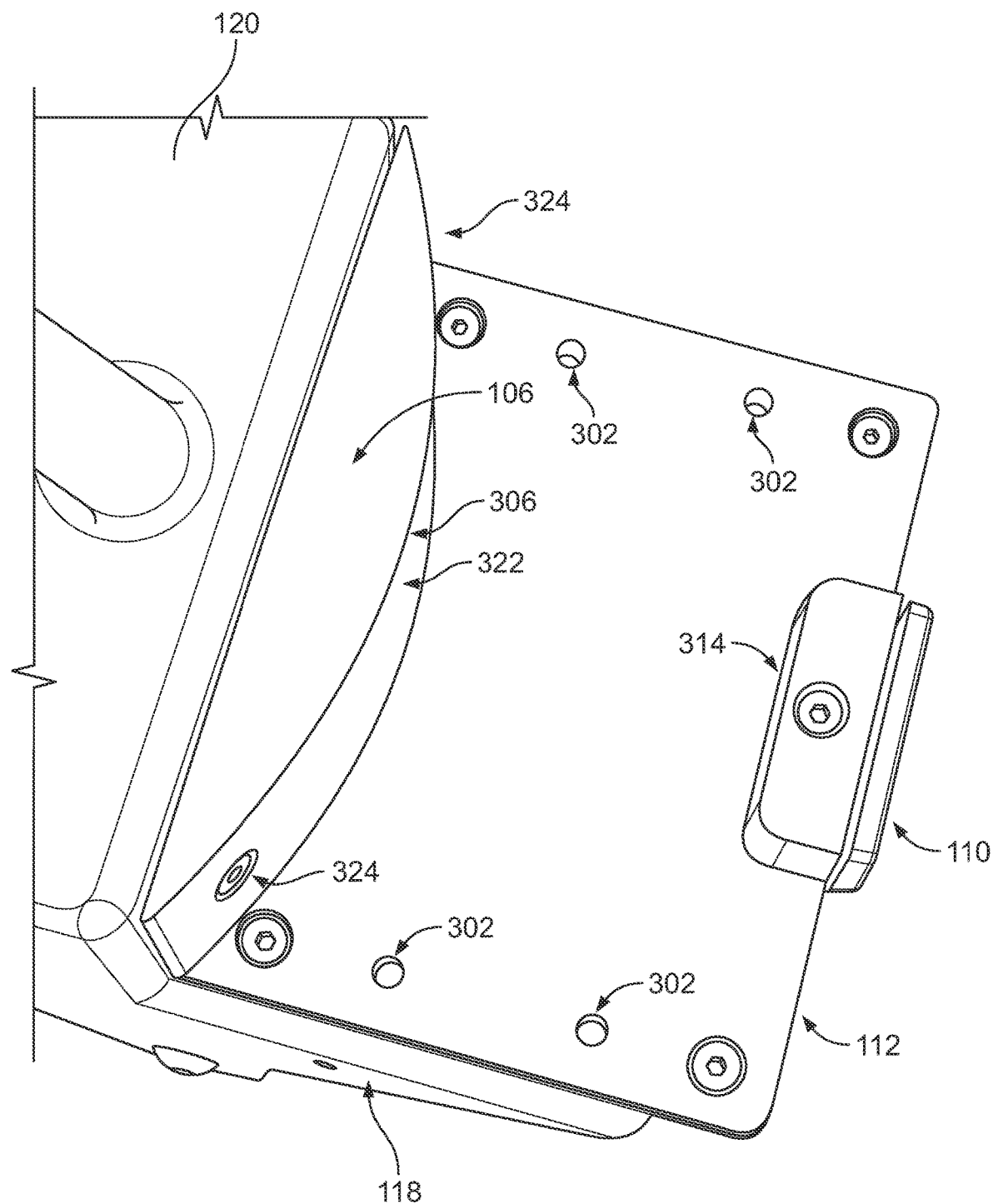
FIG. 3 depicts a top view of a portion of the equipment transporter of FIGS. 1 and 2, in accordance with various aspects of the present disclosure.

Referring to FIG. 3, in addition to providing holes in platform 112 to bolt or otherwise affix platform 112 to portion 118 of frame 120, additional holes 302 may be formed in platform 112. In various examples, holes 302 may be used to attach modular components to equipment transporter 100. For example, a yoke attachment may be secured to holes 302 and/or to other holes formed in frame 120 (e.g., holes 202 depicted in FIG. 2). The yoke attachment may extend along the x axis and may provide an attachment mechanism to attach to rails along either side of a treadmill or other piece of equipment.

Figure 6:
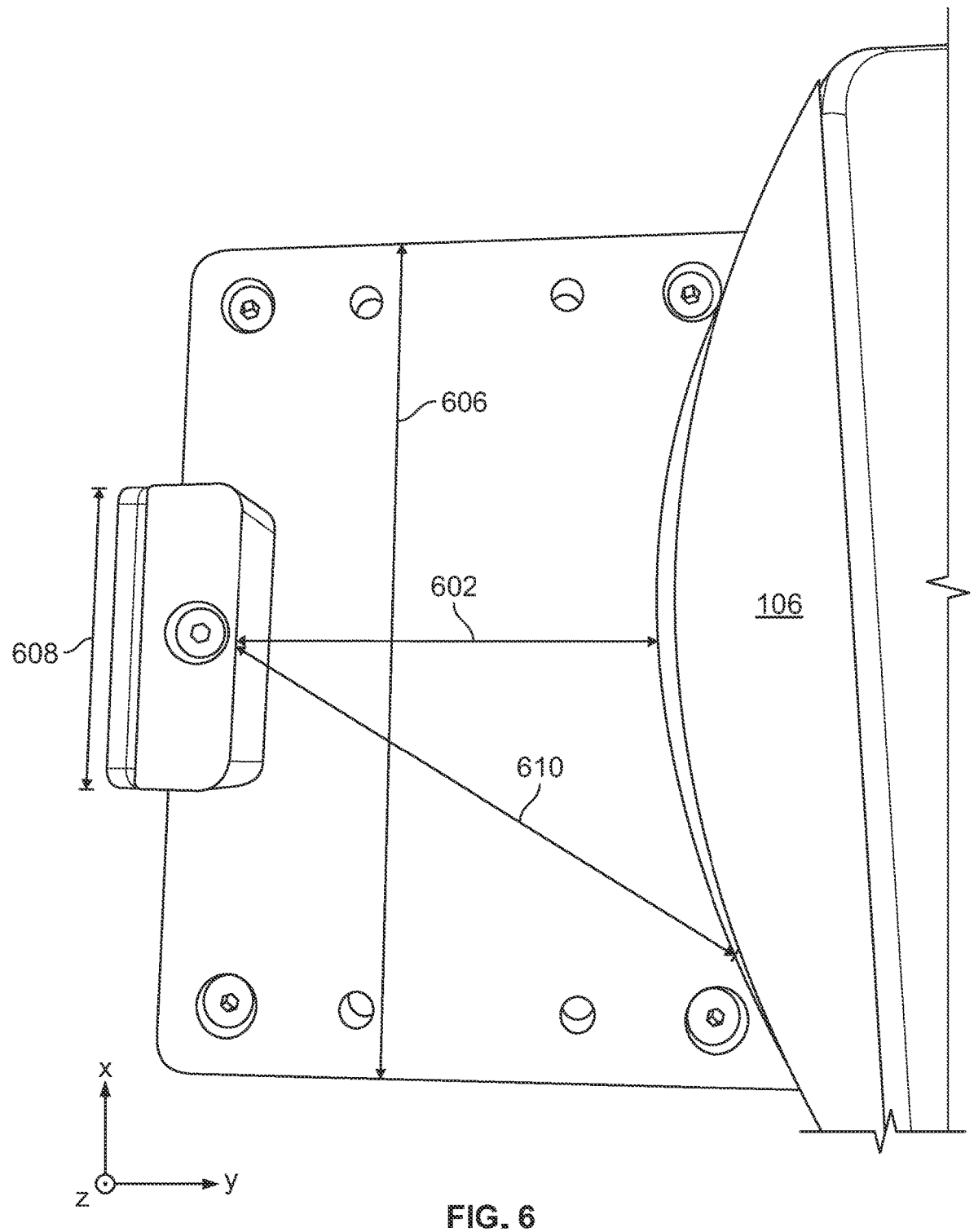
FIG. 6 depicts a top view of a portion of the equipment transporter of FIGS. 1-5, in accordance with various aspects of the present disclosure.
Figure 7:
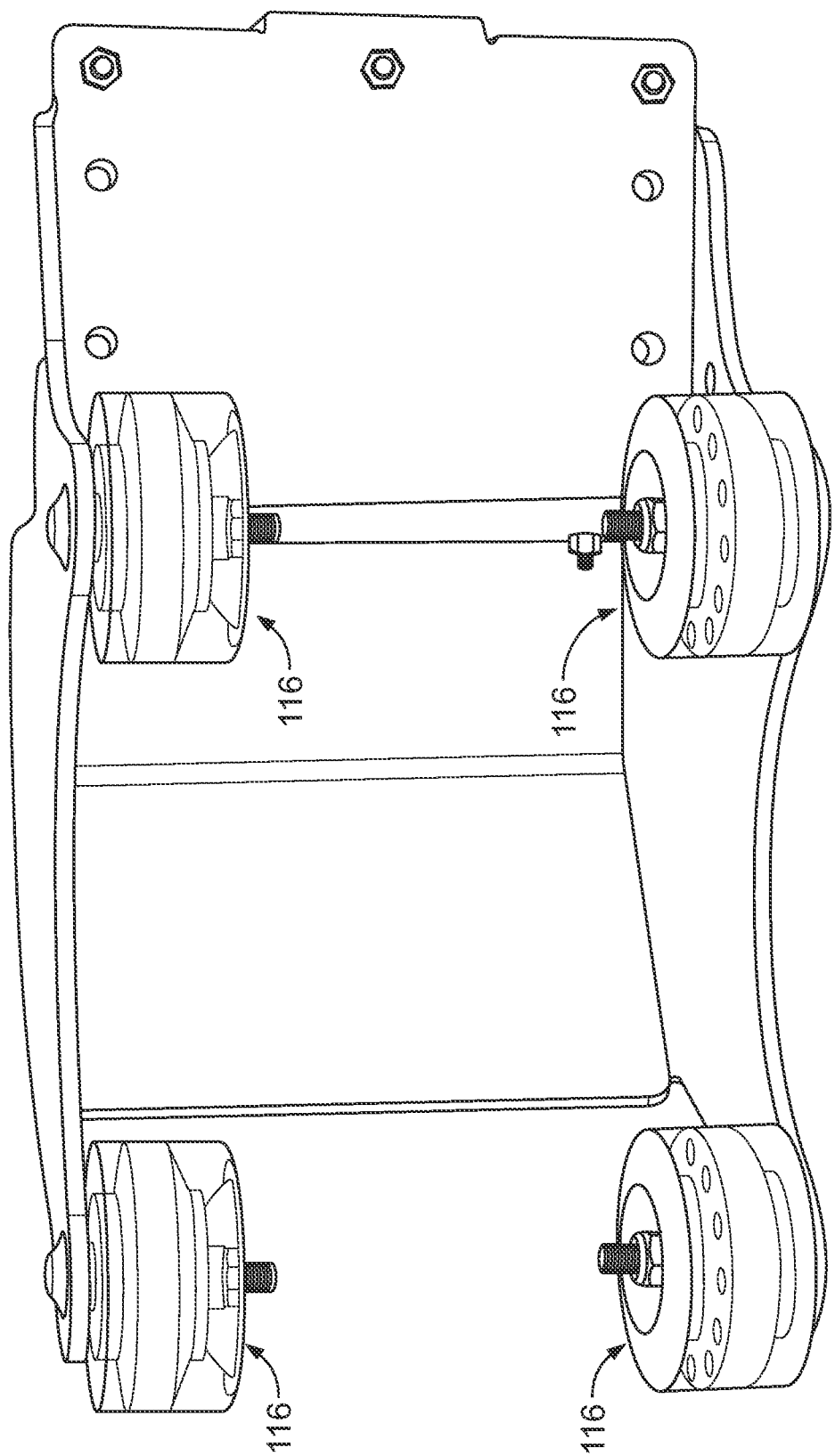
FIG. 7 depicts a bottom view of the equipment transporter of FIGS. 1-6, in accordance with various aspects of the present disclosure.
Figure 8:
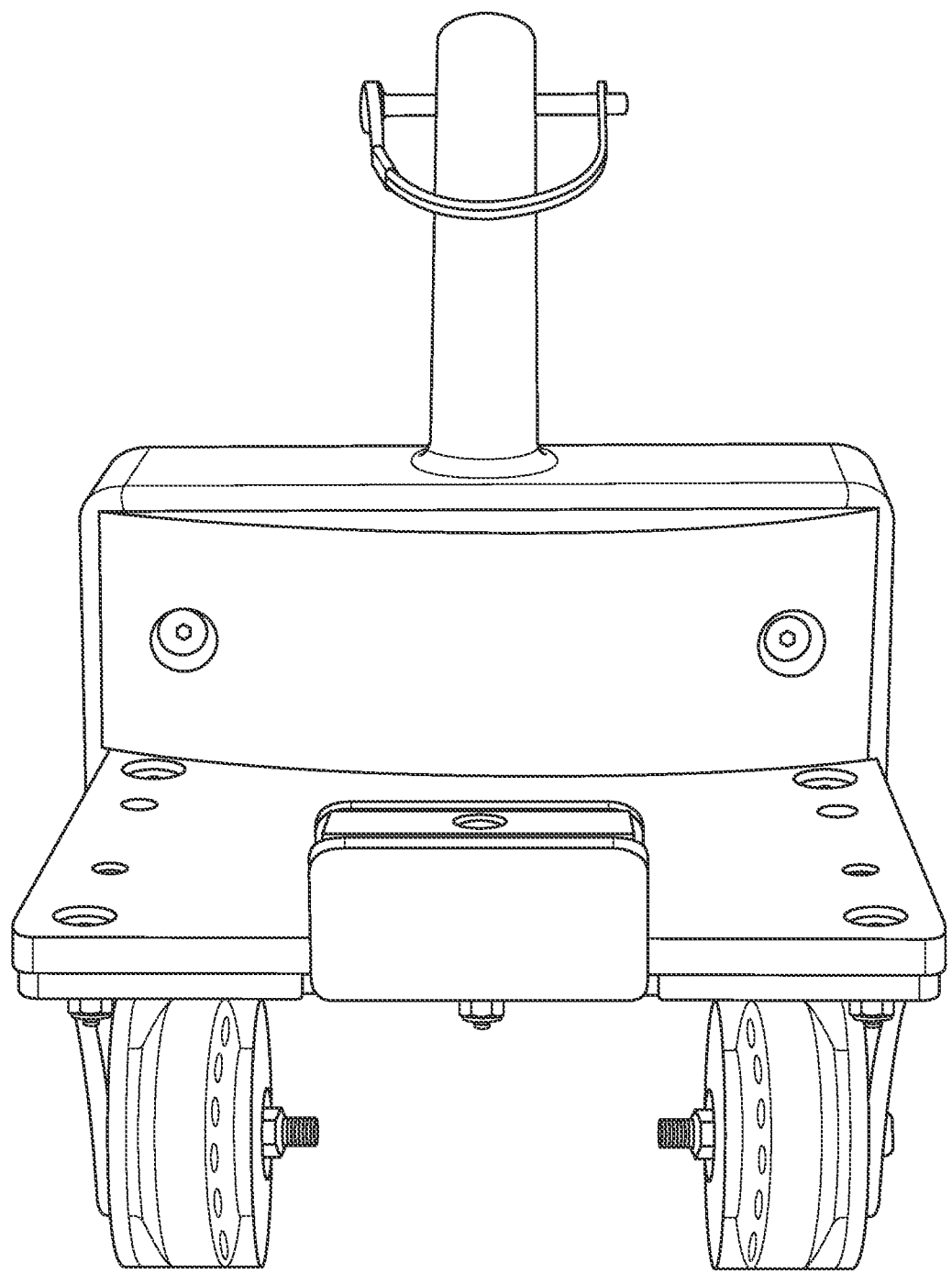
FIG. 8 depicts a front view of the equipment transporter of FIGS. 1-7, in accordance with various aspects of the present disclosure.
Figure 9:
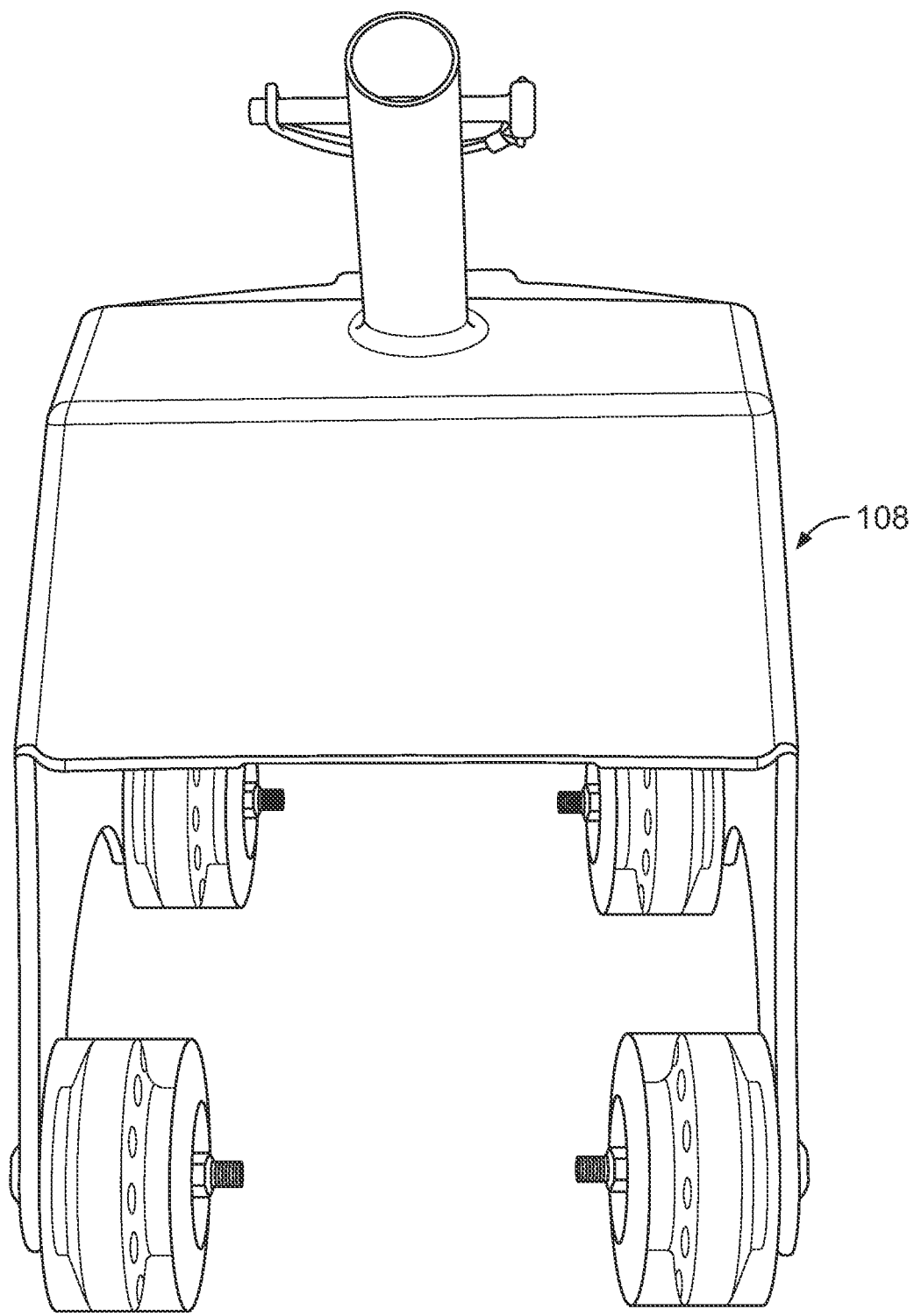
FIG. 9 depicts a back view of the equipment transporter of FIGS. 1-8, in accordance with some aspects of the present disclosure.

FIG. 6 depicts a top view of a portion of the equipment transporter 100, in accordance with various aspects of the present disclosure. In various examples, the shortest distance 602 between tab 114 and riser 106 may be approximately 3" (e.g., 3"+/−0.1", 0.2", 0.5", 1", etc.). In various examples, the distance 602 may be selected based on the size and/or shape of the support structure of the equipment which the equipment transporter 100 is designed to lift and transport. In various examples, the platform may have a width 606 along the x axis of approximately 6.5", although any suitable width may be used. The width 608 of tab 114 along the x axis may be approximately 2". In at least some examples, the shortest distance 602 between tab 114 and riser 106 may be measured from a central point of riser 106 due to the curved surface of riser 106. Accordingly, distance 602 may be less than distance 610 measured from a lateral point on riser 106.

The curvature of the front surface of riser 106 may allow an operator of equipment transporter 100 to steer equipment that is loaded onto equipment transporter 100. For example, a treadmill may be loaded onto equipment transporter 100 such that one end of the treadmill rests on two treadmill wheels and the other end (opposite the wheeled end of the treadmill) is lifted off the ground and is supported by equipment transporter 100. In such a loaded position, an operator of equipment transporter 100 may pull the treadmill in the positive y direction (referring to the axis depicted in FIG. 2). When pulling the treadmill, the tab 114 may exert a force in the positive y direction allowing the treadmill to be pulled in that direction. Similarly, the operator of equipment transporter 100 may push the treadmill in the negative y direction. While pushing the equipment transporter 100 forward (e.g., in the negative y direction of the axis depicted in FIG. 2), the riser 106 may exert a force in the negative y direction on the support structure of the treadmill, thereby pushing the treadmill toward the wheeled end of the treadmill.

The curvature of the front surface of the riser 106 along with the width of the tab (e.g., width 608 of FIG. 6) allows the operator to steer the treadmill while pushing and pulling the treadmill. For example, in FIG. 6, while pulling a treadmill in the positive y direction an operator may steer the treadmill (or other equipment) toward the positive or negative x direction by exerting a corresponding force on the handle of the equipment transporter 100. The smaller width 608 of the tab 114 relative to width 606 of platform 112 allows the equipment transporter 100 to rotate around the z axis in order to make small adjustments to steer the treadmill. Similarly, the curved front surface of riser 106 allows the equipment transporter 100 to rotate around the z axis in order to steer the treadmill. The radius of curvature of the front surface of riser 106 acts as a limit on the rotation of the equipment transporter 100 when steering the treadmill (or other equipment).

Among other potential benefits, equipment transporters in accordance with embodiments of the present disclosure may allow operators to easily load and move heavy equipment, such as treadmills and other equipment, without risk of injury to the operator and without risk of damaging the treadmill or other equipment. Additionally, the width of tab 114 and the radius of curvature of riser 106 may allow the operator to easily steer the loaded equipment in order to position the equipment as desired using the equipment transporter. The equipment transporter offers numerous advantages relative to other hand trucks and dollies that are ill-suited for purposes of moving treadmills and other exercise equipment. For example, the height of platform 112 may be selected so as to raise particular exercise equipment a small distance (e.g., ~1") from the floor. Additionally, the distance between tab 114 and riser 106 may be selected to allow a support structure of exercise equipment to be loaded onto the equipment transporter. The support structure (e.g., a support bar or beam) may be held in place on the equipment transporter by the weight of the exercise equipment and be kept in place by tab 114 and riser 106. When an operator of the equipment transporter is ready to unload the exercise equipment from the equipment transporter, the operator simply tilts the equipment transporter forward onto the front two wheels 116a (so that tab 114 is positioned underneath the support structure and does not "grab" the support structure) and pulls the equipment transporter out from under the equipment. The operator does not need to bend over in order to load or unload equipment from the equipment transporter.

Figure 10:
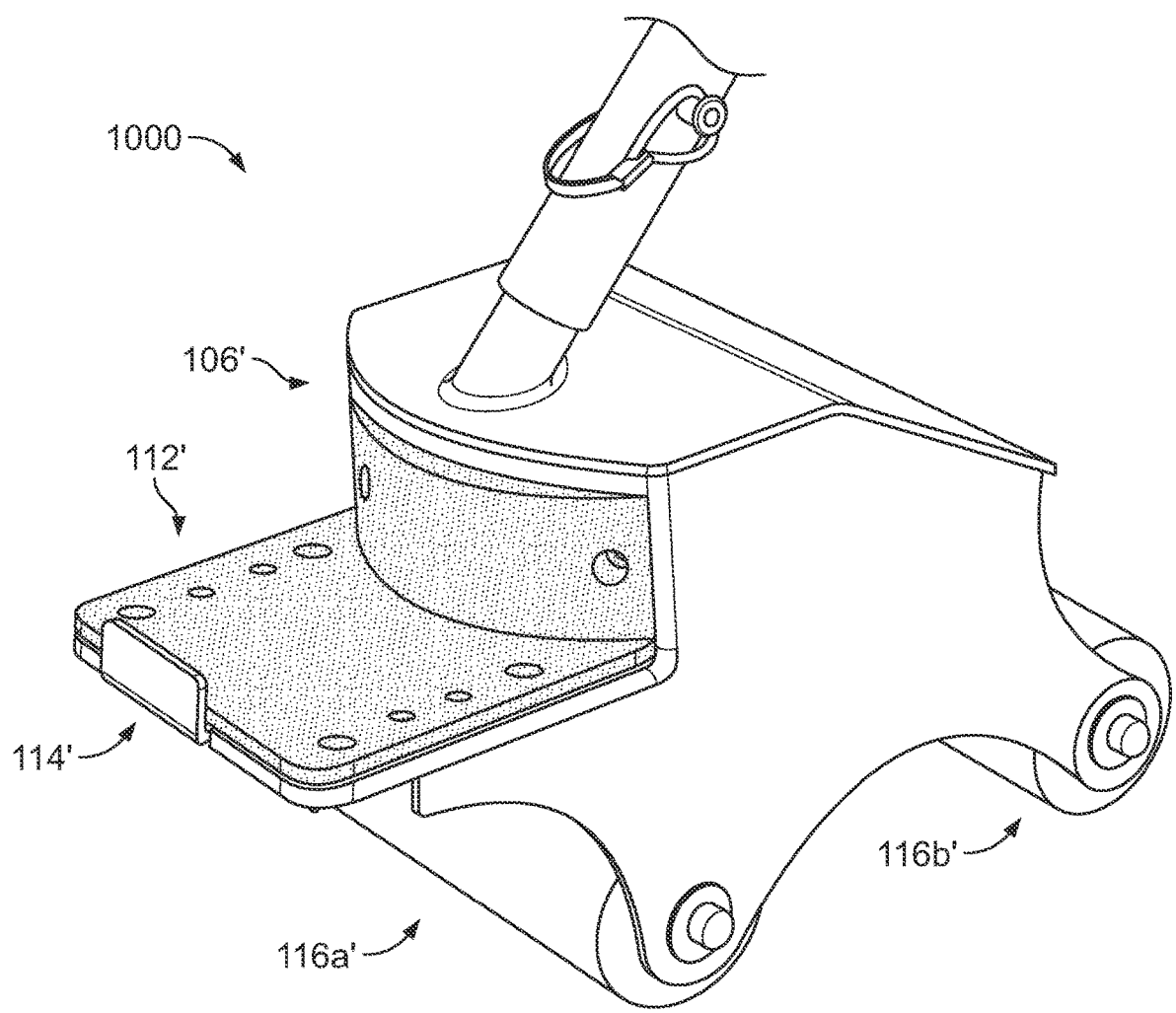
FIG. 10 depicts an isometric view of another equipment transporter, in accordance with some aspects of the present disclosure.

In some embodiments described above, one or more of the cushioning members of the platform 112, tab 114, and riser 106 may comprise UHMW polyethylene plastic. In other embodiments, different materials may be used. For example, FIG. 10 shows an equipment transporter 1000 in which the cushioning members of the platform 112', tab 114', and riser 106' comprise a carpet material covering a rigid platform 112', tab 114', and riser 106'.

In some embodiments, different configurations of wheels may be used. For example, in the equipment transporter 1000 shown in FIG. 10, a single, cylindrical front wheel 116a' and a single, cylindrical rear wheel 116b' are used instead of the pair of front wheels 116a and pair of rear wheels 116b in the equipment transporter 100 shown in FIGS. 1-9.

Figure 11A:
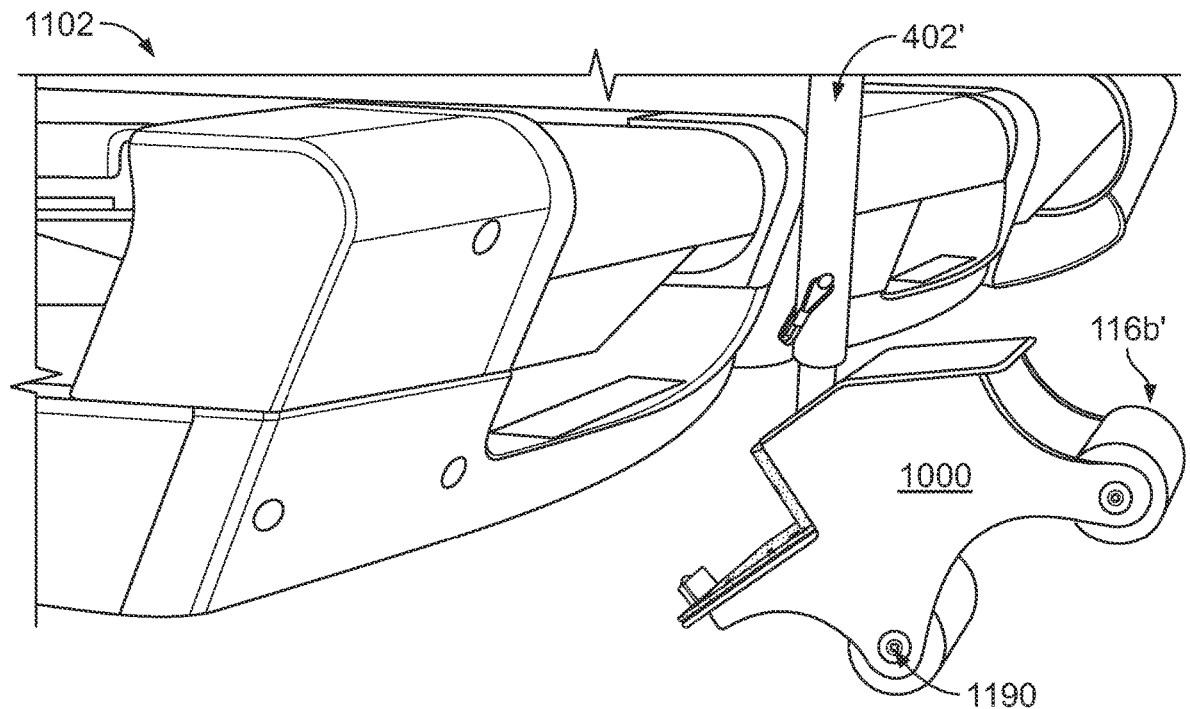
FIGS. 11A-11C depict use of the equipment transporter of FIG. 10, in accordance with some aspects of the present disclosure.
Figure 11B:
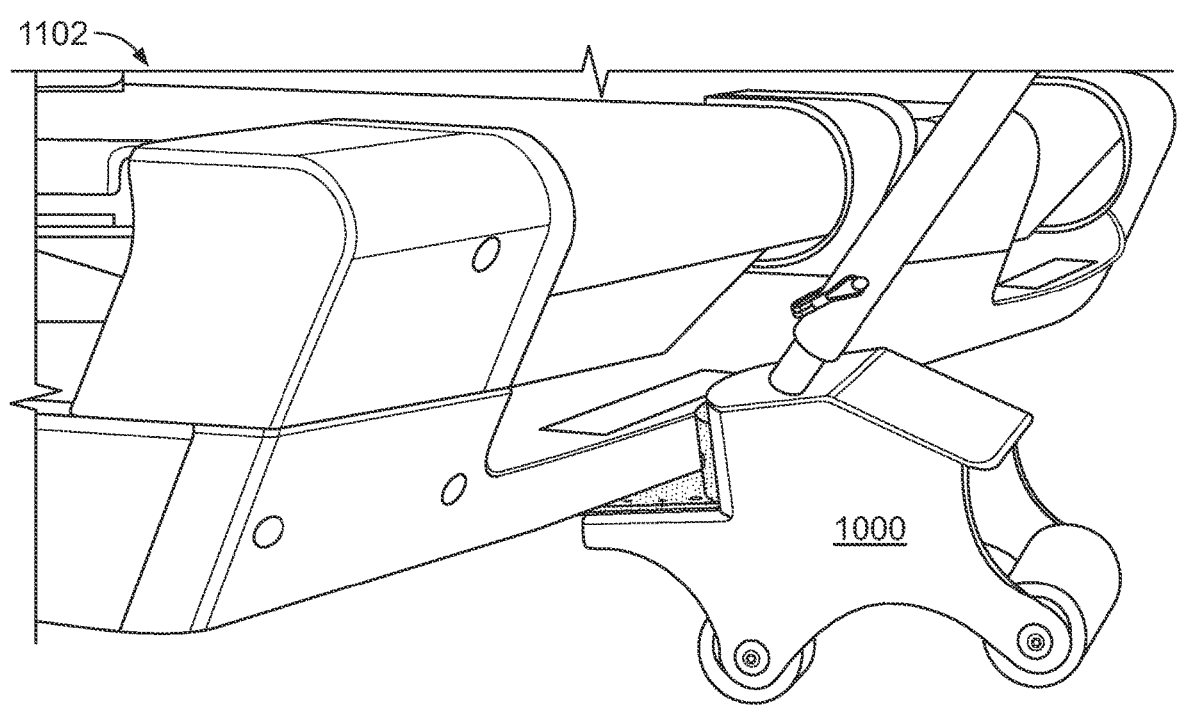
Figure 11C:
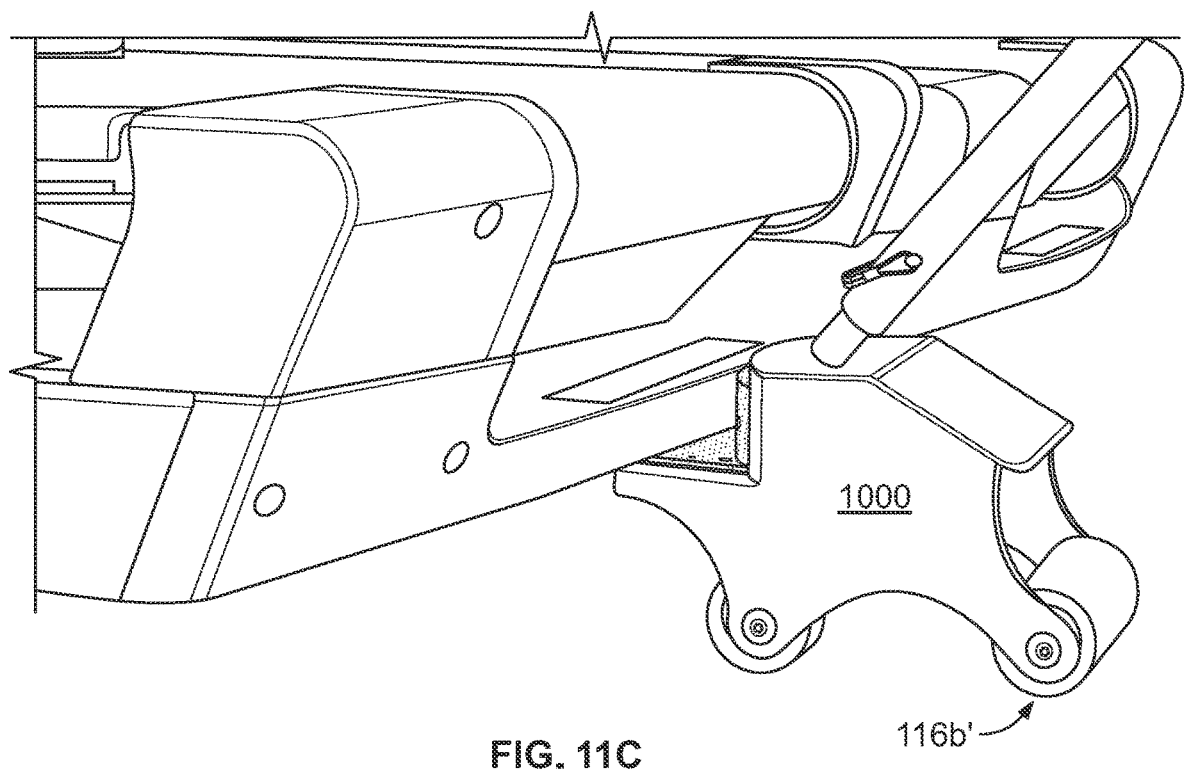

FIGS. 11A-11C illustrate a method of using the equipment transporter 1000 to move a treadmill 1102. In FIG. 11A, the equipment transporter 1000 has been rotated around axis of rotation 1190 from an upright position to a rotated position, causing rear wheels 116b' to be lifted from the ground.

In FIG. 11B, the equipment transporter 1000 has been rolled toward the treadmill to position platform 112' partially underneath the support member of the treadmill 1102. The handle 402' is then lowered to rotate the equipment transporter 1000 from the rotated position back towards the upright position, thereby positioning the support member between tab 114' and riser 106'.

In FIG. 11C, the handle 402' has been further lowered to rotate the equipment transporter 1000 into the fully upright position with the real wheel 116b' resting on the ground, causing the equipment transporter 1000 to exert an upward force on the support member of the treadmill 1102 effective to lift the non-wheeled end of the treadmill 1102 from the resting position, shown in FIG. 11A, to the elevated position, shown in FIG. 11C.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of transporting a treadmill having a set of treadmill wheels disposed at a first end of the treadmill and a support member disposed at a second end of the treadmill, the method comprising:
   positioning a treadmill transporter adjacent to second end of the treadmill, wherein the treadmill transporter comprises a set of transporter wheels, a body coupled to and rotatably supported by the set of transporter wheels, and a handle extending from the body, wherein the body of the treadmill transporter comprises a platform, a tab member located at a distal end of the platform and extending upward from an upper surface of the platform, and a curved riser located at a proximal end of the platform and extending upward from the upper surface of the platform;
   lifting the handle of the treadmill transporter to rotate the body of the treadmill transporter around an axis of rotation of the set of transporter wheels from an upright position to a rotated position, whereby the tab member is lowered to a height below the support member;
   with the body of the treadmill transporter in the rotated position, rolling the treadmill transporter towards the treadmill to position the platform at least partially underneath the support member; and
   lowering the handle of the treadmill transporter to rotate the treadmill transporter from the rotated position to the upright position, wherein the lowering the handle of the treadmill transporter causes the platform to exert an upward force on the support member effective to lift the second end of the treadmill from a resting position to an elevated position.

2. The method of claim 1, further comprising:
   pushing the handle of the treadmill transporter to cause a center region of a curved pushing face of the curved riser to press against the support member of the treadmill, thereby causing the treadmill to move in a direction away from the treadmill transporter.

3. The method of claim 1, further comprising:
   pulling the handle of the treadmill transporter to cause a pulling face of the tab member to press against the support member of the treadmill, thereby causing the treadmill to move in a direction toward the treadmill transporter.

4. The method of claim 1, further comprising unloading the treadmill, wherein unloading the treadmill comprises:
   lifting the handle of the treadmill transporter to rotate the body of the treadmill transporter around the axis of rotation of the set of transporter wheels from the upright position to the rotated position, whereby the tab member is lowered to a second height below the support member; and
   with the body of the treadmill transporter in the rotated position, rolling the treadmill transporter away from the treadmill to remove the treadmill transporter from underneath the treadmill.

5. The method of claim 1, further comprising:
   applying a downward force on a rear step of the treadmill transporter, the downward force working in conjunction with the lowering of the handle of the treadmill transporter to rotate the treadmill transporter from the rotated position to the upright position.

6. The method of claim 1, wherein the curved riser comprises a curved pushing face having a center portion and two side portions, wherein the center portion is closer to a pulling face of the tab member than each of the two side portions, and the curved pushing face has a width wider than the width of the pulling face of the tab member.

7. The method of claim 6, further comprising:
while pushing the treadmill with the treadmill transporter, applying a force in a lateral direction on the handle of the treadmill transporter to cause one of the two side portions to press against the support member of the treadmill, thereby causing the treadmill to turn in the lateral direction.

8. An equipment transporter, comprising:
a first set of wheels rotatable around an axis of rotation; and
a body coupled to and rotatably supported by the first set of wheels such that the body is rotatable around the axis of rotation of the first set of wheels, the body comprising:
a platform having an upper surface and extending in a first direction, the platform having a distal end and a proximal end;
a tab member located at the distal end of the platform and extending upward from the upper surface, wherein the tab member comprises a pulling face having a first width; and
a riser located at the proximal end of the platform and extending upward from the upper surface, the riser comprising a curved pushing face having a center portion and two side portions, wherein the center portion is closer to the pulling face of the tab member than each of the two side portions, and the curved pushing face has a second width wider than the first width of the pulling face of the tab member.

9. The equipment transporter of claim 8, wherein:
the platform comprises a metal platform frame and a platform cushioning member, wherein the platform cushioning member is supported by the platform frame and forms the upper surface of the platform;
the tab member comprises a metal tab frame and a tab cushioning member, wherein the tab cushioning member is coupled to the tab frame and forms the pulling face of the tab member; and
the riser comprises a metal riser frame and a riser cushioning member, wherein the riser cushioning member is coupled to the riser frame and forms the curved pushing face of the riser.

10. The equipment transporter of claim 9, wherein at least one of the tab cushioning member, the riser cushioning member, and the platform cushioning member comprises ultrahigh molecular weight (UHMW) polyethylene plastic.

11. The equipment transporter of claim 8, further comprising a handle comprising a shaft portion extending from the body of the equipment transporter.

12. The equipment transporter of claim 11, further comprising a grip portion of the handle, wherein the grip portion extends orthogonally from the shaft portion of the handle.

13. The equipment transporter of claim 8, wherein:
the second width of the curved pushing face of the riser is greater than two times the first width of the pulling face of the tab member.

14. The equipment transporter of claim 8, wherein the curved pushing face of the riser has a radius of curvature of approximately 5 inches.

15. The equipment transporter of claim 8, wherein the curved pushing face of the riser and the pulling face of the tab member are orthogonal to the upper surface of the platform.

16. The equipment transporter of claim 8, further comprising a rear step surface, the rear step surface extending in a second direction opposite the first direction from the axis of rotation.

17. An equipment transporter, comprising:
a first set of wheels rotatable around an axis of rotation; and
a body coupled to and rotatably supported by the first set of wheels such that the body is rotatable around the axis of rotation of the first set of wheels, the body comprising:
a platform having an upper surface and a first width, the platform extending in a first direction, the platform having a distal end and a proximal end; and
a tab member located at the distal end of the platform and extending upward from the upper surface, wherein the tab member comprises a pulling face having a second width, wherein the second width of the tab member is less than the first width of the platform.

18. The equipment transporter of claim 17, further comprising:
a riser located at the proximal end of the platform and extending upward from the upper surface, the riser comprising a curved pushing face having a center portion and two side portions, wherein the center portion is closer to the pulling face of the tab member than each of the two side portions, and the curved pushing face has a third width wider than the second width of the pulling face of the tab member.

19. The equipment transporter of claim 18, wherein:
the platform comprises a metal platform frame and a platform cushioning member, wherein the platform cushioning member is supported by the platform frame and forms the upper surface of the platform;
the tab member comprises a metal tab frame and a tab cushioning member, wherein the tab cushioning member is coupled to the tab frame and forms the pulling face of the tab member; and
the riser comprises a metal riser frame and a riser cushioning member, wherein the riser cushioning member is coupled to the riser frame and forms the curved pushing face of the riser.

20. The equipment transporter of claim 19, wherein at least one of the tab cushioning member, the riser cushioning member, and the platform cushioning member comprises ultrahigh molecular weight (UHMW) polyethylene plastic.

* * * * *